Jan. 6, 1953          J. T. VAUGHAN          2,624,850
METHOD AND MEANS FOR PRODUCING ACCURATELY-TIMED
HIGH-POWER ELECTRIC PULSES

Filed Dec. 18, 1948          2 SHEETS—SHEET 1

INVENTOR.
JOHN T. VAUGHAN
BY Alfred E. Body
ATTORNEY

INVENTOR.
JOHN T. VAUGHAN
BY Alfred C Body
ATTORNEY

Patented Jan. 6, 1953

2,624,850

UNITED STATES PATENT OFFICE 2,624,850

METHOD AND MEANS FOR PRODUCING ACCURATELY-TIMED HIGH-POWER ELECTRIC PULSES

John T. Vaughan, Cleveland, Ohio, assignor to The Ohio Crankshaft Company, Cleveland, Ohio, a corporation of Ohio Application December 18, 1948, Serial No. 66,118

12 Claims. (Cl. 307—106)

This invention pertains to the art of producing pulses of high-frequency, high-power electric energy and, more particularly, to means and method for keying high-impedance, high-frequency electric power sources to produce accurately-timed, steep wave-front and steep waveback power pulses of short-time length.

The invention is particularly adaptable to, although not limited to, the field of echo ranging. In this field, timed pulses or bursts of high-frequency energy, either sound or electrical, are projected through space. The time interval between each pulse is then devoted to listening for any echoes of the pulses after striking reflecting surfaces. The high-frequency power for these pulses can be produced in a number of ways such as electronic vacuum tube oscillators; or in the case of frequencies below 30,000 cycles per second, by rotating motor generators, which frequency is sufficient for most echo ranging.

However, electronic equipment for the same power output is relatively bulky when compared to conventional rotating power-generating equipment. The efficiency of energy conversion is low. Rotating generators have improved space factor, efficiency, dependability of operation and ruggedness of construction.

With such rotating-type equipment, producing accurately-timed pulses with good wave form; i. e., steep front and back sides has heretofore been a real problem. The output of the generator cannot be readily varied. Such generators usually have a direct-current, energized field winding. The reactance and residual magnetism of this field winding are such that a wave form with steeply shaped front and back sides simply cannot be obtained by energizing and de-energizing the field. Extremely high field energizing currents may be used to give a steep wave front and extremely high de-energizing or reverse currents may be used to give a steep wave back. Even, then, residual magnetism in the field makes it almost impossible to completely de-energize the terminals of the generator.

Keying the output of the generator by a contactor interposed between the load and the power source has been proposed. However, the currents and voltages, possibly kva., are high and arcing becomes a problem, particularly when it is desired to break the circuit and de-energize the load. Arcing pits the contacts and ruins the back side of the wave form. To control arcing, large contactors having nonarcing features can be used. However, with such contactors, accurate timing either on the make or on the break is extremely difficult. Contactors capable of making and breaking circuits with accurate timing, such as drum-type contacts, can close or complete these high energy circuits but cannot break them. Arcing on opening would very quickly ruin them. Swamping circuits across the contacts can be used to reduce the arcing. These swamping circuits do not entirely eliminate the arc and, additionally, destroy the shape of the back side of the wave.

Gas-filled, grid-controlled tubes are not practical. Their deionization time sometimes is in the neighborhood of 50 microseconds and at the frequencies of 10,000 cycles per second or higher, the tube does not have time to deionize in one-half cycle. It never stops conducting. Or if very short pulses are desired, the deionization time becomes an appreciable part of the pulse time, placing a lower limit on the pulse length.

The present invention is based on the fact that most contactors can withstand much more current on making a circuit than on breaking a circuit and, additionally, that contacts of the type which will produce accurately-timed making and breaking of electrical circuits can control relatively high make currents but only very low break currents.

The present invention contemplates energizing and de-energizing the load by the sequential closing of two sets of contacts which may be of conventional types capable of producing accurate timing. In one embodiment, the load is connected to the rotating-type high-frequency power source having a high internal inductance by means of a drum-type contactor in series with the load and source and de-energized by a drum-type contactor connected in shunt across the power source and which provides a short circuit therefor. Additionally, the invention contemplates an auxiliary contact which may be of the conventional armature-type contactor to shunt this power source shorting contactor so that it may be opened without damage due to arcing.

The primary object of the invention is to provide new and improved means and method for keying the ouput of a power source to provide accurately-timed pulses of good wave form.

A further object is the provision of means and method of producing accurately-timed pulses of good wave form wherein the principal timing contacts only complete electrical circuits and may be of relatively light construction of the type capable of accurate control.

Another object of the invention is the provision of a new and improved pulse keying circuit for the output of rotating-type power sources wherein no energy is flowing through the main contacts when they open to break the electric circuit.

Still another object is the provision of a circuit wherein drum-type contactors may be used to accurately control the beginning and end of high-power electrical pulses.

Still another object is the provision of a circuit for high currents including a high-accuracy type contactor for shorting a power source which is shunted by an auxiliary contactor when being opened whereby to prevent arcing thereof.

Another object is the provision of a high-power keying circuit including a power source and load, a contact in series with the load and one in shunt with the power source, the series contact energizing the load and the shunt contact de-energizing the load.

Another object is the provision of a method of keying a high-power electrical circuit comprising connecting the load to a power source to energize same, shorting the power source to de-energize the load rapidly and opening the load connector while the short is maintained.

The invention is comprised in certain parts and arrangement of parts and steps and combination of steps, preferred embodiments of which are described in this specification and illustrated in the accompanying drawing which is a part hereof, and wherein.

Figure 1:
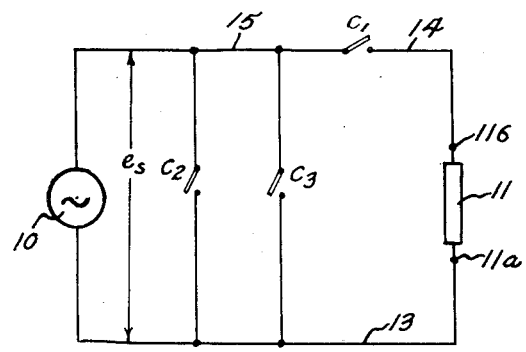
Figure 1 is a circuit diagram of electrical apparatus including a power source, load and apparatus for energizing the load in short, accurately-timed pulses which embodies the present invention.

Referring now to the drawings wherein preferred embodiments of the invention are shown for the purposes of illustration only and not for the purposes of limitation of the scope of the invention, Figure 1 shows a circuit diagram of the preferred embodiment including an alternating-current power source 10 and a suitable load 11, which load, in the case of echo-ranging equipment, would be some form of transducer for converting the electrical energy from the power source 10 into energy transmittable through the desired medium. The load 11 has a terminal 11a connected to one terminal of the power source 10 by means of a suitable conductor 13. The opposite terminal 11b of the load is connected to the other terminal of the power source 10 by means of a conductor 14, normally open contactor $C_1$ and conductor 15.

The power source 10 may be any conventional type of power-generating equipment, although, as previously stated, is a preferably rotating-type generator driven by any suitable prime mover. An example of a suitable power source is the 10,000-cycle per second, 7½ kw. average power output, high-frequency motor alternator set manufactured by The Ohio Crankshaft Company. This alternator has the characteristic that its full load current is not substantially different than the current when the output is a short circuit. This is so because the generator has a relatively high internal inductance which has a substantial impedance at 10,000 cycles. Also, it may withstand high momentary overloads, is rugged and compact and has a minimum electrical radiation field.

As further shown in Figure 1, a normally open contactor $C_2$ is connected between the conductors 13 and 15; that is to say, in shunt across the terminals of the generator or power source 10. The normally open contact $C_2$ is, in turn, shunted by a normally open contactor $C_3$.

The contacts $C_1$ and $C_2$ may be of relatively light construction sufficient to carry high currents in the neighborhood of 100 amperes, such as a conventional drum-type contactor. Their primary function is simply to close electrical circuits at accurately-timed intervals. At no time when these contacts open is there an electrical potential thereacross of the type that would arc or pit the contacts. The contact $C_3$ is required to interrupt relatively large currents and should preferably be designed for this current interruption. As will appear, its timing has no effect on the pulse and its construction may disregard this feature. Conventional armature-type relays having magnetic arc blow-out circuits may be employed.

Figure 2:
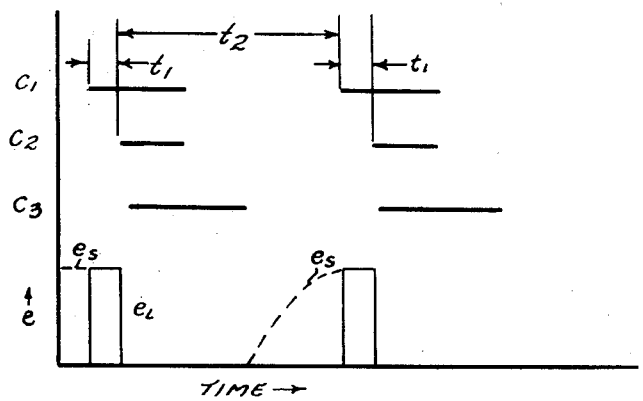
Figure 2 is a time-base diagram showing the sequence of operation of the various contacts of Figure 1.

The timing sequence of the contacts is shown in Figure 2. The potential $e_s$ of the power source is shown by the dashed lines in Figure 2. The potential across the load 11 is shown by the solid line marked $e_1$.

In the initiation of a cycle, all of the contacts $C_1$, $C_2$ and $C_3$ are open. Thus, the potential $e_s$ of the source 10 is at a maximum. The contact $C_1$ closes and the potential $e_1$ is immediately applied across the load. Now if the contact $C_1$ were to be opened, the interrupted current would be such as to ionize the air in the space between the contacts to produce an arc, thus burning the contact $C_1$ badly and preventing the extremely rapid de-energization of the load 11.

The present invention contemplates means for preventing this arcing and accurately controlling the instant of de-energization of the load and the shape of the back side of the wave form of the pulse. Thus, after a predetermined time interval $t_1$ from the closing of contact $C_1$, the contact $C_2$ closes. As this contact $C_2$ is directly shunted across the power source 10 and the load 11, $e_s$ very rapidly drops to zero and the load is completely and rapidly de-energized. The contacts $C_1$ and $C_2$ are thus both closed. The contact $C_1$ can now be opened without arcing or other detrimental effects. However, if the contact $C_2$ were opened, a relatively large arc would develop thereacross due to the flow of current therethrough due to the shorted generator.

The present invention also contemplates the provision of means whereby the contact $C_2$ may be opened without the detrimental effects of this arcing. Thus, shortly after the contact $C_2$ closes, the contact $C_3$ is closed. This contact may be of conventional armature-type construction. The accuracy of its movement is not important. Its principal attribute must be that it can break circuits having relatively high currents flowing therein without detrimental effects from the resulting arc.

After the contact $C_3$ is closed, obviously the contact $C_2$ may be opened without danger of arcing, likewise the contact $C_1$ if it has not already been opened.

After both the contact $C_1$ and $C_2$ have opened, the contact $C_3$ may be opened, the arcing effect being of no concern. Also, because of the arcing effect, if any, the voltage $e_s$ of the source will build up relatively slowly. At any time after the voltage $e_s$ of the source 10 has built up, the cycle may be repeated and the contact $C_1$ closed, thus re-energizing the load. After a predetermined and desired time interval, the contact $C_2$ closes shorting the power source and de-energizing the load. Subsequent to the closing of the contact $C_2$, the contact $C_3$ closes. Contacts $C_1$ and $C_2$ may then be opened without fear of arcing or the like. Subsequently, contactor $C_3$ is opened.

Figure 3:
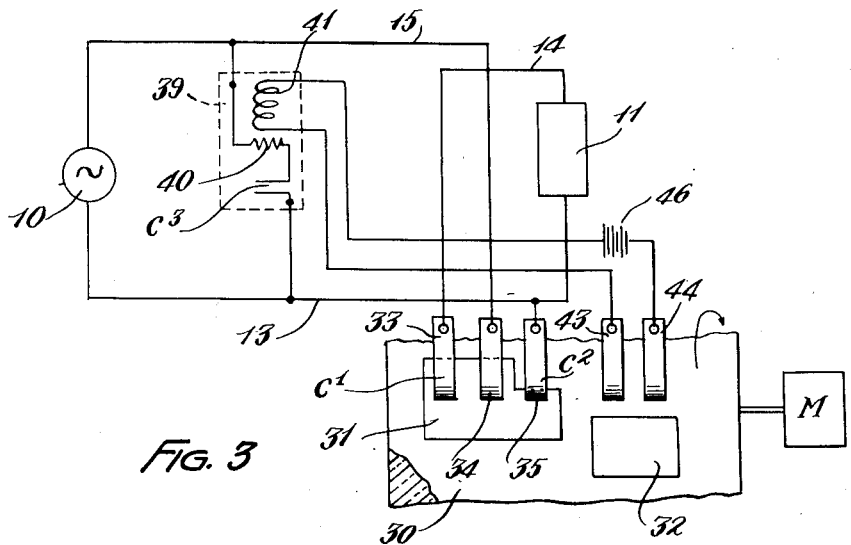
Figure 3 is a partly schematic picture of the wiring diagram of apparatus for effecting the present invention.

Figure 3 shows somewhat schematically a combination of more or less conventional mechanism and contacts as an illustration of a practical embodiment of the invention and which is able to carry out the method of the invention. In Figure 3, there is shown a drum-type contactor, including a drum 30, rotated by any suitable means such as hand rotation or any type of motor M. If extremely accurate timing of the pulses is desired, then an alternating-current, synchronous-type motor may be employed. With the apparatus as shown, and as will be described, the speed of rotation of the drum will determine, in part at least, the relative timing of the closing of the contacts and, therefore, the duration of the pulses of energy as well as the rate of repetition thereof.

The drum 30 is shown in exploded plan view. The drum is formed of an insulating material and has a pair of commutator segments 31, 32 mounted flush with the surface of the insulating material. The commutator segment 31 is engaged in the embodiment shown by three contact arms 33, 34, 35 which, in conjunction with the commutator segment 31, form, in effect, the contacts $C_1$, $C_2$. Thus, the contact arm 34 is connected directly to the power source 10 by the wire 15. As the drum 30 rotates, the arm 34 engages the commutator segment 31 and raises the segment 31 to the electric potential of the conductor 15. In effect then, the contacts $C_1$ are formed by the commutator segment 31 and the arm 33. When the arm 33 engages the commutator segment 31, the circuit is completed between the wires 15 and 14, thus energizing the load 11.

The contact arm 35 and the commutator segment 31, in effect, form the contacts $C_2$. The contact arm 35 is connected to the conductor 13 so that when the segment 31 contacts the arm 35, the contacts $C_2$ are, in effect, closed and the power source 10 is shorted out. As explained above, the contacts $C_2$ close at a predetermined time interval following the closing of contacts $C_1$. The commutator segment in the embodiment shown is shaped relative to the contact arms 33, 35 such that the contacts $C_2$ will be closed sometime subsequent to the contacts $C_1$. The shaping of the segment 31 will depend upon the relative speed of rotation of the drum 30 and the desired pulse duration. However, the segment 31 may be made of a uniform shape and the position of the contact arms relative to the drum 30 may be varied. The specific form of the contact drum and the segments form no part of the present invention.

In the embodiment shown in Figure 3, an armature-type switch 39 is shown schematically which includes the contacts $C_3$, a magnetic arc blow-out coil 40 and an energizing coil 41. As shown, the magnetic blow-out coil 40 is in electrical series with the contacts $C_3$ between the wires 13 and 15. The coil 41, when energized, closes the contacts $C_3$ to provide a bypassing shunt circuit for the contacts $C_2$. In the embodiment shown, the energization of the coil 41 is controlled by other contacts on the drum 30. These contacts include the contact arms 43, 44 so positioned as to engage the commutator segment 32 and in engaging this segment, can be an energizing circuit through the coil 41 and a battery or other power source 46. The commutator segment 32 is so placed on the drum 30 that it will energize the coil 41 subsequent to the closing of the contacts $C_2$ and will hold the coil energized until both contacts $C_1$ and $C_2$ have opened. The contacts $C_1$ and $C_2$ are shown as closed in Figure 1. Obviously, in other positions, the contacts will be open.

It is, of course, possible that the contacts $C_2$ can be provided with antiarcing means so that the contacts $C_3$ need not be provided.

Figure 4:
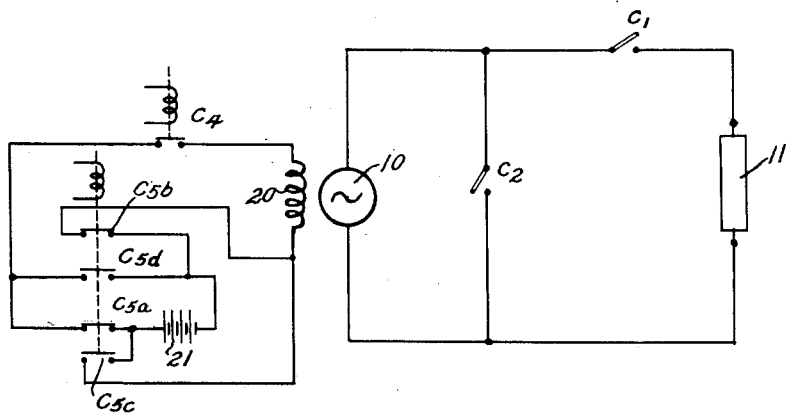
Figure 4 is another schematic diagram showing an alternative embodiment of the invention.
Figure 5:
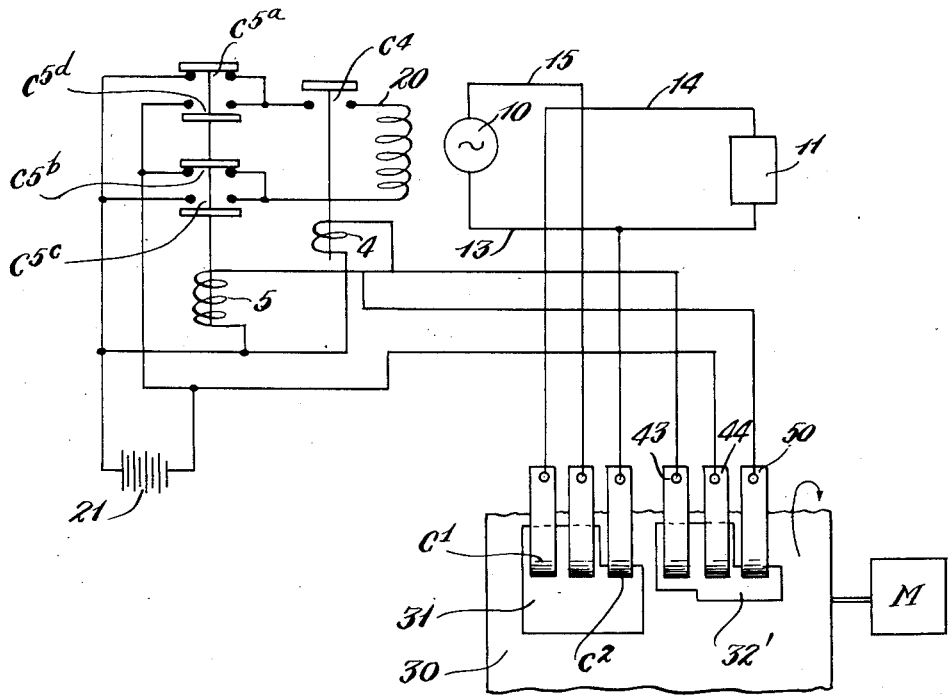
Figure 5 is a partly schematic diagram of apparatus for carrying out the alternative embodiment of the invention.

Referring now to Figure 4, a modification of the invention is shown. Here, the power source 10 is shown with its normal and conventional field excitation winding 20 connected to a suitable field exciting power source such as the battery 21. The normal excitation circuit of the field winding 20 includes normally closed contact $C_{5a}$, normally closed contact $C_4$, the field winding 20, normally closed contact $C_{5b}$ and the battery 21. In operation, the contacts $C_1$ and $C_2$ are the same as shown in Figure 1 and are closed in the same sequence. After the contact $C_2$ closes, the contact $C_4$ is opened which de-energizes the field 20. Subsequent to the de-energization of the field 20, the contact $C_1$ and $C_2$ may be opened generally without detrimental effect. Should the residual magnetism of the power source 10 be such that there is a tendency for arcing to occur across the contact $C_2$ when it opens, means are provided for energizing the field 20 in an opposite direction such as to kill this residual magnetism at least for the time when the contact $C_2$ is being opened. Thus, normally open contacts $C_{5c}$ and $C_{5d}$ are provided which, when closed simultaneously with the opening of contacts $C_{5a}$ and $C_{5b}$ together with the closing of contact $C_4$, energize the field 20 in a reverse direction to that when the contacts $C_{5a}$ and $C_{5b}$ were closed. The field current flowing rapidly kills any residual flux remaining in the generator. If desired, other controls may be provided which will kill the residual field without permitting it to build up with opposite polarity. Figure 5 is a view similar to the showing of Figure 3 of apparatus for carrying out the alternative embodiment of the invention shown in Figure 4. In this embodiment, the drum contactor is identical to that shown in Figure 3, except that an additional contact arm 50 and a commutator segment 32' is provided having a somewhat different configuration than the commutator segment 32. In this embodiment, the energization of the field 20 of the power source 10 is controlled by relay 4 having contacts $C_4$ and the direction of the field energizing current is controlled by the relay 5 having normally closed contacts $C_{5a}$ and $C_{5b}$ and normally opened contacts $C_{5c}$ and $C_{5d}$. In the embodiment shown, the commutator segment 32' is so spaced and positioned relative to the commutator segment 31 that contact arms 43, 44 engage segment 32' prior to the closing of the contacts $C_1$ or $C_2$, thus energizing relay 4 and closing contacts $C_4$ which energizes the field of the power source 10 from the battery 21, energizing conductors 13 and 15.

As the drum 30 continues to rotate, contact $C_1$ is closed, energizing the load 11 and then contact C2 is closed, shorting out the power source 10. Immediately after the closing of contacts C2, the commutator segment 32' passes from under the arm 43, thus de-energizing relay 4, opening contacts C4 and de-energizing the field 20 of the power source 10. The output of the generator from the power source 10 then falls off so that the contacts C1 and C2 can be re-opened without arcing. Just prior to the de-energizing of relay 4, the contact arm 50 engages a narrow portion on the segment 32', thus energizing relay 5. Energization of relay 5 opens normally closed contacts C5a and C5b and closes normally open contacts C5c and C5d which reverses the polarity of the energizing current for the field 20 to kill any residual magnetism which may remain in the field of the power source 10. The delay between the energization of relay 5 and the opening of contacts C4 is very short. Otherwise, the field magnetism would build up in the opposite direction and high-frequency power would again be generated. If the residual magnetism does not present a problem, then the relay 5 may be dispensed with.

With the output of the generator effectively reduced to zero, contacts C1 and C2 can open without arcing as the drum 30 continues to turn and the apparatus is then again in position to repeat its cycle.

The de-energization of electrical loads in the event of large overloads is described and claimed in my copending application Serial No. 313,487 filed October 7, 1952.

Thus, it will be seen that embodiments of the invention have been described which accomplish the objectives set forth hereinabove and others. It is obvious that alterations and modifications will occur to others upon a reading and understanding of this specification. It is my intention to have such modifications and alterations included as part of my invention insofar as they come within the scope of the appended claims.

Having thus described my invention, I claim:

1. The method of repetitively energizing an electrical load from a high-frequency electrical power source for a predetermined plurality of accurately timed intervals comprising connecting said load to said power source to energize same and, after a predetermined time interval, shorting said power source to de-energize said load and, while said load is shorted, disconnecting said load from said power source, and repeating said steps at timed intervals.

2. The method of claim 1 wherein said short is removed subsequent to the disconnecting of the load from the source.

3. The method of repetitively energizing an electrical load from a high-frequency electrical power source for a plurality of predetermined accurately timed interval comprising connecting said load to said power source and, after a predetermined time interval, shorting said power source, then shunting said shorting connection, subsequently disconnecting said load from said power source and opening said shorting connection and subsequently opening the shunting connection of said shorting connection, and repeating said steps at predetermined time intervals.

4. The method of repetitively energizing an electrical load from a high-frequency electrical power source for a plurality of predetermined accurately timed interval comprising connecting said load to said power source and, after a predetermined time interval, shorting said power source to de-energize said load, disconnecting said load from said power source, shunting said shorting connection, opening said shorting connection and then opening said shunting connection, and repeating said steps at predetermined time intervals.

5. In an electrical circuit including a high-frequency electric generator, an electrical load therefor and conductors to connect said power source to said load, apparatus for controlling the energization of said load for predetermined accurate time intervals, including an electrical connector in series with one of said conductors, a second electrical connector connected across the conductors connected to said power source, and means for actuating said series connector to energize said load and subsequently actuating said second mentioned connector to short circuit the power source and de-energize said load.

6. In an electrical circuit including a high-frequency electric generator, an electrical load therefor and conductors to connect said power source to said load, apparatus for controlling the energization of said load of predetermined accurate time intervals, including an electrical connector in series with one of said conductors, a second electrical connector connected across the conductors connected to said power source, means for actuating said series connector to energize said load and subsequently actuating said second mentioned connector to short circuit the power source and de-energize said load, switch means for reducing the flow of current through said second mentioned connector, and means for still subsequently actuating said switch means whereby said second mentioned connector can be opened without arcing.

7. The combination of claim 6 wherein said first two mentioned connectors are of the relatively light, accurate-timing type and said switch means is a switch of a type not harmed by arcing when breaking a high electric current.

8. The combination of claim 6 wherein the generator has a separately energized field and said connectors are of the relatively-light, accurate-timing type and said switch means include means for de-energizing said field of said power source.

9. The combination of claim 6 wherein the generator has a separately energized field and said switch means include switches for energizing said field in a reverse direction whereby to kill residual magnetism of said power source.

10. In an electric circuit adapted to supply high-energy, accurately-timed pulses from a high-frequency electric power source to an electric load therefor, a drum-type switch having one set of contacts connected in series with and, when closed, energizing said load, a second set of contacts connected across and, when closed, shorting said power source and an armature-type switch connected in parallel with said second set of contacts and, when closed, also shorting said power source and allowing said second set of contacts to be opened whereby to prevent arcing of said shorting contacts and means for actuating said contacts and switch in the order stated and then opening said contacts before said switch opens and subsequently opening said switch.

11. In a high-frequency electric power circuit including a power source of a type which may be temporarily short circuited without harmful effects, a load and conductors connecting said load to the power source, the combination of first, second and third switch means, said first means being in series with one conductor, each of said second and third switch means being shunted directly across said power source, said first switch means when closed energizing said load, said second switch means when closed shorting said power source and de-energizing said load, said third switch means when closed also acting to short said power source and being closed at least during the opening of said second switch means and means for actuating said switch means in timed sequence.

12. In an electric circuit including a power source and an electric load therefor, a first switch which, upon closing connects said load to said power source and energizes same, a second switch which, when closed, shorts said power source during the time when said first switch is closed and, thus, de-energizes said load, a third switch which, when closed, shunts said second switch when shorting current is flowing through said second switch, whereby said second switch may then be opened without danger of arcing.

JOHN T. VAUGHAN.

REFERENCES CITED

The following references are of record in the file of this patent:

UNITED STATES PATENTS

| Number | Name | Date |
|--------|------|------|
| 194,111 | Sawyer | Aug. 11, 1877 |
| 389,297 | Griscom | Sept. 11, 1888 |
| 1,998,355 | Shea | Apr. 16, 1935 |
| 2,041,461 | Floyd et al. | May 19, 1936 |